Patented Jan. 22, 1935

1,988,532

UNITED STATES PATENT OFFICE 1,988,532

METHOD OF PRODUCING MIXED ESTERS OF CELLULOSE

David R. Wiggam and John S. Tinsley, Kenvil, N. J., assignors to Hercules Powder Company, Wilmington, Del., a corporation of Delaware No Drawing. Application March 30, 1931, Serial No. 526,550

18 Claims. (Cl. 260—101)

Our invention relates to a method for the production of mixed esters of cellulose containing nitrate groups and in addition two or more organic acid groups.

The method embodying our invention involves reacting cellulose nitrate with two or more organic acids. Desirably, the cellulose nitrate is such that it will contain from about 0.25% to 5.0% of nitrogen and one of the organic acids with which the nitrated cellulose is reacted will be an acid anhydride.

The new composition of matter in accordance with our invention will be found to possess novel and advantageous characteristics, more particularly, in that, for example, it will be found to be soluble in a wide range of solvents and insoluble in such substances as toluol, ethanol, etc., etc. and in that it may be plasticized with various plasticizers. In particular, it will be found that from solutions of the mixed ester there may be deposited clear, strong films on evaporation of the solvent. The composition will be found to be highly advantageous for the production of photographic films, filaments, threads, lacquers, celluloid like substances, etc.

The composition embodying our invention may be produced in accordance with the method embodying our invention by reacting nitrated cellulose with at least two organic acids, one of which is an acid anhydride. As has been indicated, the nitrated cellulose will desirably contain from 0.25% to 5.0% nitrogen.

As illustrative, for example, nitrated cellulose may be reacted with acetic anhydride, propionic anhydride, butyric anhydride, etc., or mixtures thereof, and with butyric acid, propionic acid, isobutyric acid, phthalic acid, heptoic acid, etc., or mixtures thereof. In effecting the reaction the nitrated cellulose will be admixed with the selected organic acids, the organic acids preferably being in excess of the amount theoretically required and the reaction facilitated by the application of heat. Desirably, the reaction will be effected in the presence of a catalyst and as such, for example, may be used sulphuric acid, zinc chloride, benzene sulfonic acid, etc. When the reaction is completed the mixed ester will be found to be dissolved in the excess of acid used and may be readily recovered from solution by precipitation through the medium of a liquid non-solvent for the mixed ester. For precipitation of the mixed ester there may be used, for example, an organic liquid, as ethyl ether, isopropyl ether, ethanol etc. or water.

As a specific example of the carrying out of the method in accordance with our invention for the production of the new composition of matter, for example, cellulose nitrate, containing say 2.4% nitrogen, is treated with a mixture of 2.5 parts of acetic anhydride, 5 parts butyric acid and 0.1 part sulphuric acid, the reaction mixture being stirred for three hours at a temperature of 30° C., then being heated to 50° C. for a period of 2 hours. At the end of the heating period the mixed ester formed will be found to be entirely dissolved in the excess of acid. The mixed ester cellulose nitro-aceto-butyrate will be produced and may be recovered by precipitating the reaction mixture into, for example, water.

The mixed ester cellulose nitro-aceto-butyrate thus prepared will be found to be a white amorphous substance, soluble in acetone, ethyl lactate, ethyl acetate, butyl acetate, ethylene dichloride, etc. and to be insoluble in toluol, ethanol, etc. The mixed ester may, where desirable, be plasticized with, for example, aromatic esters of phosphoric acid, esters of phthalic acid, chlorinated diphenyl, etc., or mixtures and on the evaporation of solvent from a solution thereof, will deposit clear strong film.

By the method illustrated above, various mixed esters in accordance with our invention may be produced by the use of other acid anhydrides in addition to acetic anhydride, or by the substitution of other acid anhydrides or mixtures thereof for acetic anhydride, or by the use of other acids with or in substitution for butyric acid. Further, by the use of cellulose containing varying amounts of nitrogen and by manipulation of the kinds and quantities of acids and anhydrides used, compositions having widely varying properties and solubilities may be produced.

It will be understood that our invention involves the method for producing mixed esters of cellulose involving broadly the reacting of a nitrated cellulose with two or more organic acids, one of which is desirably an anhydride, wide variation in the method as illustrated herein and, more particularly, variation in the kinds and quantities of acid and anhydride used being contemplated by us as included in our invention.

What we claim and desire to protect by Letters Patent is:

1. The method of producing mixed cellulose esters which includes reacting cellulose nitrate with an anhydride of an organic acid having the formula $C_nH_{2n}O_2$ where $n$ represents a number 2-4 inclusive and an organic acid having the formula $C_nH_{2n}O_2$ where $n$ represents a number 3-7 inclusive.

2. The method for producing mixed cellulose esters which includes reacting cellulose nitrate containing from 0.25% to 5.0% of nitrogen with an anhydride of an organic acid having the formula $C_nH_{2n}O_2$ where $n$ represents a number 2-4 inclusive and an organic acid having the formula $C_nH_{2n}O_2$ where $n$ represents a number 3-7 inclusive.

3. The method for producing mixed cellulose esters which includes reacting cellulose nitrate containing from 0.25% to 5.0% of nitrogen with an anhydride of an organic acid having the formula $C_nH_{2n}O_2$ where $n$ represents a number 2-4 inclusive and an organic acid having the formula $C_nH_{2n}O_2$ where $n$ represents a number 3-7 inclusive in the presence of a catalyst.

4. The method of producing mixed cellulose esters which include reacting cellulose nitrate with an anhydride of an organic acid having the formula $C_nH_{2n}O_2$ where $n$ represents a number 2-4 inclusive and an organic acid having the formula $C_nH_{2n}O_2$ where $n$ represents a number 3-7 inclusive in the presence of sulphuric acid.

5. The method of producing mixed cellulose esters which includes reacting cellulose nitrate with an anhydride of an organic acid having the formula $C_nH_{2n}O_2$ where $n$ represents a number 2-4 inclusive and an organic acid having the formula $C_nH_{2n}O_2$ where $n$ represents a number 3-7 inclusive, the anhydride being in excess of that required in the reaction.

6. The method of producing mixed cellulose esters which includes reacting cellulose nitrate with an anhydride of an organic acid having the formula $C_nH_{2n}O_2$ where $n$ represents a number 2-4 inclusive and an organic acid having the formula $C_nH_{2n}O_2$ where $n$ represents a number 3-7 inclusive, precipitating the mixed esters through the medium of a liquid non-solvent of the mixed esters.

7. The method of producing mixed cellulose esters which includes reacting cellulose nitrate containing from 0.25 to 5.0% of nitrogen with an anhydride of an organic acid having the formula $C_nH_{2n}O_2$ where $n$ represents a number 2-4 inclusive and an organic acid having the formula $C_nH_{2n}O_2$ where $n$ represents a number 3-7 inclusive, the anhydride being in excess of that required in the reaction.

8. The method of producing mixed cellulose esters which includes reacting cellulose nitrate containing from 0.25 to 5.0% of nitrogen with an anhydride of an organic acid having the formula $C_nH_{2n}O_2$ where $n$ represents a number 2-4 inclusive and an organic acid having the formula $C_nH_{2n}O_2$ where $n$ represents a number 3-7 inclusive, precipitating the mixed esters through the medium of a liquid non-solvent of the mixed esters.

9. The method of producing mixed cellulose esters which includes reacting cellulose nitrate containing from 0.25 to 5.0% of nitrogen with an anhydride of an organic acid having the formula $C_nH_{2n}O_2$ where $n$ represents a number 2-4 inclusive and an organic acid having the formula $C_nH_{2n}O_2$ where $n$ represents a number 3-7 inclusive in the presence of sulphuric acid.

10. The method of producing mixed cellulose esters which includes reacting cellulose nitrate with acetic anhydride and an organic acid having the formula $C_nH_{2n}O_2$ where $n$ represents a number 3-7 inclusive.

11. The method of producing mixed cellulose esters which includes reacting cellulose nitrate containing from 0.25% to 5.0% of nitrogen with acetic anhydride and an organic acid having the formula $C_nH_{2n}O_2$ where $n$ represents a number 3-7 inclusive, in the presence of a catalyst.

12. The method of producing mixed cellulose esters which includes reacting cellulose nitrate containing from 0.25% to 5.0% of nitrogen with acetic anhydride and an organic acid having the formula $C_nH_{2n}O_2$ where $n$ represents a number 3-7 inclusive, in the presence of sulphuric acid.

13. The method of producing mixed cellulose esters which includes reacting cellulose nitrate with propionic anhydride and an organic acid having the formula $C_nH_{2n}O_2$ where $n$ represents a number 3-7 inclusive.

14. The method of producing mixed cellulose esters which includes reacting cellulose nitrate containing from 0.25% to 5.0% of nitrogen with propionic anhydride and an organic acid having the formula $C_nH_{2n}O_2$ where $n$ represents a number 3-7 inclusive in the presence of of a catalyst.

15. The method of producing mixed cellulose esters which includes reacting cellulose nitrate containing from 0.25% to 5.0% of nitrogen with propionic anhydride and an organic acid having the formula $C_nH_{2n}O_2$ where $n$ represents a number 3-7 inclusive in the presence of sulphuric acid.

16. The method of producing mixed cellulose esters which includes reacting cellulose nitrate with butyric anhydride and an organic acid having the formula $C_nH_{2n}O_2$ where $n$ represents a number 3-7 inclusive.

17. The method of producing mixed cellulose esters which includes reacting cellulose nitrate containing from 0.25% to 5.0% of nitrogen with butyric anhydride and an organic acid having the formula $C_nH_{2n}O_2$ where $n$ represents a number 3-7 inclusive in the presence of a catalyst.

18. The method of producing mixed cellulose esters which includes reacting cellulose nitrate containing from 0.25% to 5.0% of nitrogen with butyric anhydride and an organic acid having the formula $C_nH_{2n}O_2$ where $n$ represents a number 3-7 inclusive in the presence of sulphuric acid.

JOHN S. TINSLEY.
DAVID R. WIGGAM.